(12) United States Patent
Na et al.

(10) Patent No.: US 9,093,015 B2
(45) Date of Patent: Jul. 28, 2015

(54) DISPLAY APPARATUS, UPGRADE APPARATUS, CONTROL METHOD THEREOF, AND DISPLAY SYSTEM

(71) Applicant: SAMSUNG ELECTRONICS CO., LTD., Suwon-si (KR)

(72) Inventors: Kee-wook Na, Suwon-si (KR); Byung-kwon Kang, Suwon-si (KR); Shane Cho, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 236 days.

(21) Appl. No.: 13/740,748

(22) Filed: Jan. 14, 2013

(65) Prior Publication Data

US 2013/0194246 A1  Aug. 1, 2013

(30) Foreign Application Priority Data

Jan. 27, 2012 (KR) .................. 10-2012-0008204
Jan. 31, 2012 (KR) .................. 10-2012-0009425
May 24, 2012 (KR) .................. 10-2012-0055373

(51) Int. Cl.
*G06F 3/038* (2013.01)
*G09G 3/20* (2006.01)
*H04N 21/418* (2011.01)
*H04N 21/443* (2011.01)
*H04N 21/485* (2011.01)

(52) U.S. Cl.
CPC .............. *G09G 3/20* (2013.01); *H04N 21/4183* (2013.01); *H04N 21/4436* (2013.01); *H04N 21/485* (2013.01)

(58) Field of Classification Search
CPC ....... H04N 21/4183; G06F 8/65; G09G 5/003

USPC ........... 345/204, 211, 212; 348/553, E5.096, 348/563, 571, 725; 725/132, 140, 151; 717/168
See application file for complete search history.

(56) References Cited

U.S. PATENT DOCUMENTS 6,154,633 A * 11/2000 Landgraf et al. .............. 725/151
2007/0046815 A1 * 3/2007 Lee .............................. 348/553
2007/0174418 A1 * 7/2007 Garcia et al. .................. 709/217
2007/0261046 A1 * 11/2007 Miller ........................... 717/168

(Continued)

FOREIGN PATENT DOCUMENTS

KR  10-2010-0054586 A  5/2010

OTHER PUBLICATIONS

Communication dated Jul. 10, 2013 issued by the European Patent Office in counterpart European Patent Application No. 13152275.7.

*Primary Examiner* — Koosha Sharifi-Tafreshi
(74) *Attorney, Agent, or Firm* — Sughrue Mion, PLLC

(57) ABSTRACT

Embodiments disclose a display apparatus including: an image processing device which processes an image signal; a display device which displays an image based on the processed image signal; a connection device which connects to an upgrade apparatus which processes the image signal; a power supply device which supplies power to each component of the display apparatus and the upgrade apparatus through the connection device; and a first controller which controls the connection device to receive the processed image signal from the upgrade apparatus when the upgrade apparatus is connected through the connection device, wherein the power supply device is controlled by the upgrade apparatus connected through the connection device.

63 Claims, 8 Drawing Sheets

(56) References Cited

U.S. PATENT DOCUMENTS

| | | | |
|---|---|---|---|
| 2008/0094408 A1* | 4/2008 | Yin et al. | 345/581 |
| 2008/0263184 A1 | 10/2008 | De Haan et al. | |
| 2009/0073168 A1* | 3/2009 | Jiao et al. | 345/426 |
| 2011/0032329 A1* | 2/2011 | Bauza et al. | 348/43 |
| 2011/0173472 A1* | 7/2011 | Ogura | 713/323 |
| 2011/0214152 A1 | 9/2011 | Canova et al. | |
| 2011/0242115 A1 | 10/2011 | Tsao et al. | |

\* cited by examiner

DISPLAY APPARATUS, UPGRADE APPARATUS, CONTROL METHOD THEREOF, AND DISPLAY SYSTEM

CROSS-REFERENCE TO RELATED APPLICATION

This application claims priorities from Korean Patent Applications No. 10-2012-0008204, filed on Jan. 27, 2012, No. 10-2012-0009425, filed on Jan. 31, 2012 and No. 10-2012-0055373, filed on May 24, 2012 in the Korean Intellectual Property Office, the disclosures of which are incorporated herein by reference.

BACKGROUND

1. Field

Apparatuses and methods consistent with the exemplary embodiments relate to a display apparatus, an upgrade apparatus, a control method, and a display system. More particularly, exemplary embodiments relate to a display apparatus connected to an upgrade apparatus, an upgrade apparatus, a control method, and a display system.

2. Description of the Related Art

A display apparatus, such as a TV, processes image signals/image data transmitted from various external image sources and autonomously stores images on a display panel. Available display apparatuses for general users may include a TV and a monitor. For example, a display apparatus configured as a TV processes broadcast signals transmitted from the outside according to various types of image processing, e.g., decoding and scaling, and provides images of broadcast channels desired by users.

The display apparatus has an embedded image processing board configured as a circuit, including various kinds of chip sets and a memory to conduct such image processing.

However, in view of various factors, such as technology development, different user demands, and user convenience factors, a display apparatus having advanced capabilities is required. In other words, functions of the display apparatus can be improved and upgraded using hardware and software.

When an upgrade apparatus of the related art is connected to the display apparatus to upgrade hardware or software, the newly connected upgrade apparatus performs an image processing process while components of the display apparatus are idle. In this situation, electric power may be applied to the idle resources, causing unnecessary power consumption.

SUMMARY

Exemplary embodiments may provide a display apparatus including: an image processing device which processes an image signal; a display device which displays an image based on the processed image signal; a connection device which connects an upgrade apparatus which processes the image signal; a power supply device which supplies power to each component of the display apparatus and the upgrade apparatus through the connection device; and a first controller which controls the connection device to receive the processed image signal from the upgrade apparatus when the upgrade apparatus is connected through the connection device, wherein the power supply device is controlled by the upgrade apparatus connected through the connection device.

The display apparatus may further include a first storage device which stores at least one program performing a predetermined function, wherein the upgrade apparatus may include a second storage device storing an upgraded version of the at least one program and a second controller executing the at least one program in the upgraded version, and the second controller may control the power supply device when the upgrade apparatus is connected through the connection device.

The second controller may control the power supply device to selectively block supply of power either to the first storage device and the first controller of the display apparatus or to the upgrade apparatus when the upgrade apparatus is connected through the connection device.

The display apparatus may further include a user input device which inputs a user selection, wherein the second controller may control the power supply device to block supply of power to the first storage device and the first controller when a power saving mode of the display apparatus is selected through the user input device.

The display apparatus may further include a user input device which inputs a user selection, wherein when a first user selection is input through the user input device, the second controller may determine whether the first user selection is executable by the at least one program of the first storage device, and control the power supply device to supply power to the first storage device and the first controller if the first user selection is executable by the at least one program of the first storage device.

The second controller may control the power supply device such that the upgrade apparatus is in a sleep mode when the first user selection is executable by the at least one program of the first storage device.

The second controller may control the power supply device such that the upgrade apparatus is turned off when the first user selection is executable by the at least one program of the first storage device.

The second controller may control the power supply device to supply power both to the first storage device and the first controller, and to the upgrade apparatus.

The display apparatus may further include a user input device to input a user selection, wherein the second controller may control the power supply device to supply power both to the first storage device and the first controller and to the upgrade apparatus when a second user selection is input through the user input device and the second user selection executes the program of the first storage device and the program of the second storage device at the same time.

The first controller may further include a graphic processing device to conduct post-processing on the processed image signal, and the graphic processing device may conduct post-processing on the image signal received from the upgrade apparatus.

The post-processing may include at least one of graphic application processing, image quality enhancement, definition enhancement, image filtering, giving a sepia effect, and 2D-3D conversion.

The first controller may control the image processing device to mix the post-processed image signal and the image signal received from the upgrade apparatus and may control the display device to display an image based on the mixed image signal.

The post-processing of the graphic processing device may be carried out by running a shader program.

The post-processing of the graphic processing device may be asynchronously carried out with the image processing of the upgrade apparatus.

The first controller may control the connection device to transmit the image signal processed by the image processing device to the upgrade apparatus, and to receive the post-processed image signal from the upgrade apparatus.

The post-processing may include at least one of graphic application processing, image quality enhancement, definition enhancement, image filtering, giving a sepia effect, and 2D-3D conversion.

The first controller may control the image processing device to mix the image signal processed by the image processing device with the image signal received from the upgrade apparatus, and controls the display device to display an image based on the mixed image signal.

The image processing of the image processing device may be asynchronously carried out with the post-processing of the graphic processing device.

Exemplary embodiments may also provide an upgrade apparatus of a display apparatus including: a connection device connected to the display apparatus including a power supply device and displaying an image; an image processing device which processes an image signal corresponding to the image displayed on the display apparatus; and a second controller which controls the power supply device of the display apparatus when the upgrade apparatus is connected to the display apparatus through the connection device.

The display apparatus may further include a first storage device storing at least one program to perform a predetermined function and a first controller to execute the program, the upgrade apparatus may further include a second storage device which stores an upgraded version of the at least one program, and the second controller may control the power supply device to selectively block supply of power either to the first storage device and the first controller or to the second storage device when the upgrade apparatus is connected through the connection device.

The second controller may control the power supply device to block supply of power to the first storage device and the first controller when a user selection of a power saving mode is received from the display apparatus through the connection device.

When a first user selection is received from the display apparatus through the connection device, the second controller may determine whether the first user selection is executable by the at least one program of the first storage device, and control the power supply device to supply power to the first storage device and the first controller if the first user selection is executable by the at least one program of the first storage device.

The second controller may control the power supply device such that the upgrade apparatus is in a sleep mode when the first user selection is executable by the at least one program of the first storage device.

The second controller may control the power supply device such that the upgrade apparatus is turned off when the first user selection is executable by the at least one program of the first storage device.

The second controller may control the power supply device to supply power both to the first storage device and the first controller, and to the second storage device.

The second controller may control the power supply device to supply power both to the first storage device and the first controller and to the second storage device when a second user selection is received from the display apparatus through the connection device and the second user selection may execute the at least one program of the first storage device and the at least one program of the second storage device at the same time.

The second controller may include a graphic processing device to conduct post-processing on the processed image signal and control the connection device to receive the processed image signal from the display apparatus, and the graphic processing device may conduct post-processing on the received image signal.

The post-processing may include at least one of graphic application processing, image quality enhancement, definition enhancement, image filtering, giving a sepia effect, and 2D-3D conversion.

The second controller may control the connection device to transmit the post-processed image signal to the display apparatus.

The post-processing of the graphic processing device may be carried out by running a shader program.

The post-processing of the graphic processing device may be asynchronously carried out with the image processing of the display apparatus.

Exemplary embodiments may also provide a control method of a display apparatus including an image processing device to process an image signal and a power supply device to supply power, the control method including: connecting an upgrade apparatus to process the image signal displayed on the display apparatus; and controlling, by the upgrade apparatus, a power supply from the power supply device to the display apparatus and the upgrade apparatus.

The controlling the power supply may include the upgrade apparatus selectively blocking the power supply either to a first storage device and a first controller of the display apparatus, or to the upgrade apparatus.

The control method may further include inputting a user selection of selecting a power saving mode of the display apparatus, wherein the selectively blocking the power supply may block power supply to the first storage device and the first controller.

The control method may further include inputting a first user selection and transmitting the first user selection to the upgrade apparatus; and determining by the upgrade apparatus whether the first user selection is executable by a program of the first storage device, wherein the controlling the power supply may include supplying power to the first storage device and the first controller when the first user selection is determined to be executed by the program of the first storage device.

The controlling the power supply may include controlling power supply so that the upgrade apparatus is in a sleep mode when the first user selection is determined to be executed by the program of the first storage device.

The controlling the power supply may include blocking power supply to the upgrade apparatus when the first user selection is determined to be executed by the program of the first storage device.

The controlling the power supply may include supplying power both to the first storage device and the first controller of the display apparatus, and to the upgrade apparatus.

The control method may further include inputting a second user selection and transmitting the second user selection to the upgrade apparatus, wherein the controlling the power supply may include supplying power both to the first storage device and the first controller and to the upgrade apparatus when the second user selection executes a program of the first storage device and a program of a second storage device at the same time.

The control method may further include receiving the processed image signal from the upgrade apparatus; and conducting post-processing on the received processed image signal.

The post-processing may include at least one of graphic application processing, image quality enhancement, definition enhancement, image filtering, giving a sepia effect, and 2D-3D conversion.

The control method may further include mixing the post-processed image signal and the image signal received from the upgrade apparatus; and displaying an image based on the mixed image signal.

The conducting the post-processing may be carried out by a graphic processing device running a shader program.

The conducting the post-processing may be asynchronously carried out with the image processing of the upgrade apparatus.

The control method may further include processing an image signal by the image processing device; transmitting the processed image signal to the upgrade apparatus; receiving a post-processed image signal from the upgrade apparatus.

The post-processing may include at least one of graphic application processing, image quality enhancement, definition enhancement, image filtering, giving a sepia effect, and 2D-3D conversion.

The control method may further include mixing the image signal processed by the image processing device with the image signal received from the upgrade apparatus and displaying an image based on the mixed image signal.

The image processing of the image processing device may be asynchronously carried out with the post-processing of the upgrade apparatus.

Exemplary embodiments may provide a control method of an upgrade apparatus connected to a display apparatus including a power supply device, the control method including: connecting the upgrade apparatus to process an image displayed on the display apparatus; controlling, by the upgrade apparatus, a power supply from the power supply device to the display apparatus and the upgrade apparatus.

The display apparatus may further include a first storage device to store at least one program to perform a predetermined function and a first controller to execute the program, the upgrade apparatus may further include a second storage device to store an upgraded version of the at least one program, and the controlling the power supply may include the upgrade apparatus selectively blocking power supply either to the first storage device and the first controller of the display apparatus, or to the second storage device of the upgrade apparatus.

The control method may further include receiving a user selection of selecting a power saving mode of the display apparatus, wherein the selectively blocking the power supply may block power supply to the first storage device and the first controller.

The control method may further include receiving a first user selection from the display apparatus; and determining by the upgrade apparatus whether the first user selection is executed by the at least one program of the first storage device, wherein the controlling the power supply may include supplying power to the first storage device and the first controller when the first user selection is determined to be executed by the at least one program of the first storage device.

The controlling the power supply may include controlling power supply so that the upgrade apparatus is in a sleep mode when the first user selection is determined to be executable by the program of the first storage device.

The controlling the power supply may include supplying power both to the first storage device and the first controller of the display apparatus, and to the second storage device of the upgrade apparatus.

The control method further may include receiving a second user selection to execute the program of the first storage device and the program of the second storage device at the same time from the display apparatus, wherein the controlling the power supply may include supplying power both to the first storage device and the first controller and to the second storage device.

The control method may further include receiving a processed image signal from the display apparatus to display the image; and conducting post-processing on the received image signal.

The post-processing may include at least one of graphic application processing, image quality enhancement, definition enhancement, image filtering, giving a sepia effect, and 2D-3D conversion.

The control method may further include transmitting the post-processed image signal to the display apparatus.

The conducting the post-processing may be carried out by a graphic processing device of the upgrade apparatus running a shader program.

Exemplary embodiments may provide a display system including: a display apparatus including a first image processing device to process an image signal, a display device to display an image based on the processed image signal, a power supply device to supply power, and a first storage device to store at least one program to perform a predetermined function; and an upgrade apparatus connected to the display apparatus and including a second image processing device to process the image signal and a second storage device to store an upgraded version of the at least one program, wherein a control device of the upgrade apparatus controls the power supply device to control power supply to the display apparatus and the upgrade apparatus.

The display apparatus may further include a first graphic processing device to conduct post-processing on the processed image signal and may control the first graphic processing device to receive the image signal processed by the second image processing device from the upgrade apparatus and to conduct post-processing on the received image signal.

The upgrade apparatus may further include a second graphic processing device to conduct post-processing on the processed image signal and may control the second graphic processing device to receive the image signal processed by the first image processing device from the display apparatus and to conduct post-processing on the received image signal.

Exemplary embodiments may provide a control method of upgrading hardware or software when an upgrade apparatus is connected to a display apparatus, the control method including: supplying power to the display apparatus and the upgrade apparatus; receiving an image signal in the display apparatus; transmitting the received image signal to the upgrade apparatus; controlling the upgrade apparatus to process the received image signal; transmitting the processed image signal to the display apparatus; post-processing the processed image signal in the display apparatus; mixing the post-processed image signal and the processed image signal, and scaling the mixed signal; and displaying an image corresponding to the scaled mixed signal.

BRIEF DESCRIPTION OF THE DRAWINGS

The above and/or other aspects will become apparent and more readily appreciated from the following description of the exemplary embodiments, taken in conjunction with the accompanying drawings, in which.

DETAILED DESCRIPTION OF EXEMPLARY EMBODIMENTS

Figure 1:
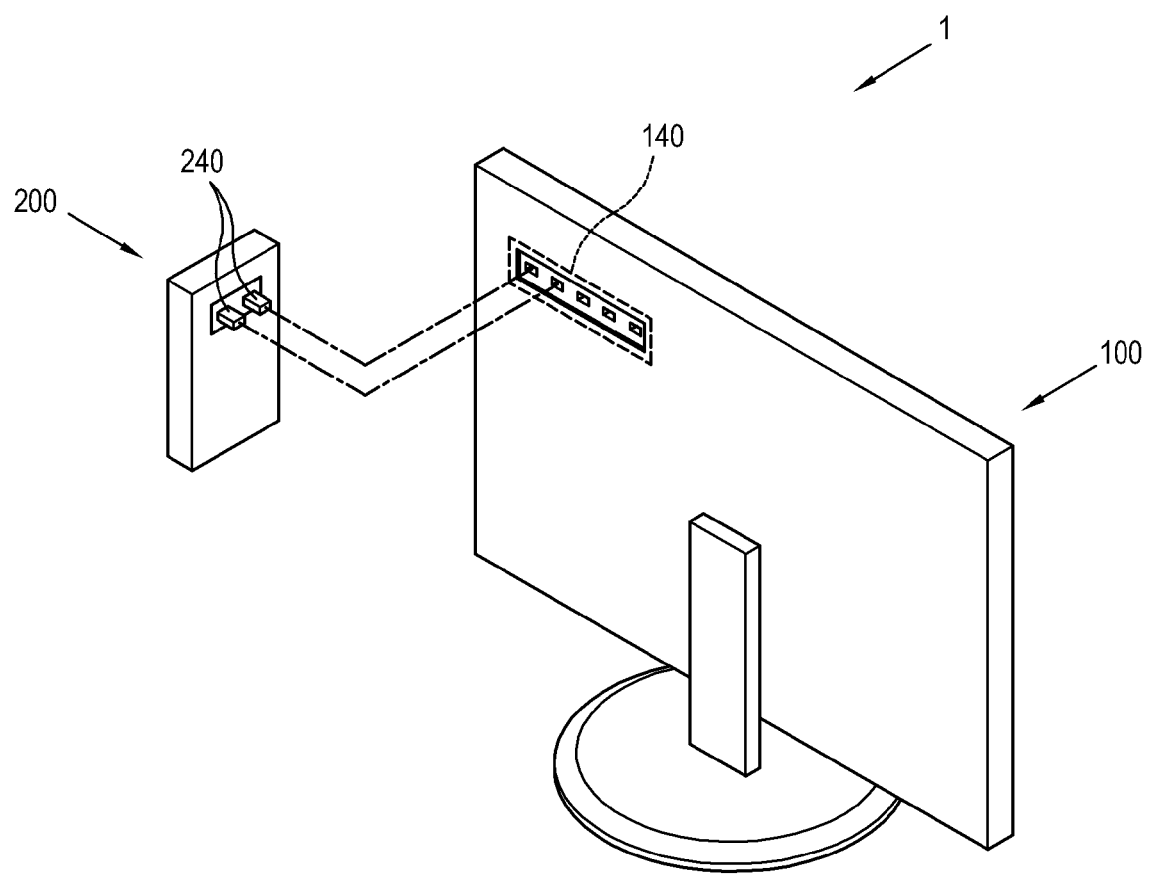
FIG. 1 schematically illustrates a display system according to an exemplary embodiment.

Below, exemplary embodiments will be described in detail with reference to accompanying drawings so as to be easily realized by a person having ordinary knowledge in the art. The exemplary embodiments may be embodied in various forms without being limited to the exemplary embodiments set forth herein. Descriptions of well-known parts are omitted for clarity and conciseness, and like reference numerals refer to like elements throughout.

FIG. 1 schematically illustrates a display system 1 according to an exemplary embodiment.

As shown in FIG. 1, the display system 1 according to the present embodiment includes a display apparatus 100 and an upgrade apparatus 200. The upgrade apparatus 200 is an external peripheral device connected to the display apparatus 100. The display apparatus 100 and the upgrade apparatus 200 are connected to each other to communicate.

The upgrade apparatus 200 either provides a function which is not supported by the display apparatus 100 or provides a function to improve an existing function of the display apparatus 100. The upgrade apparatus 200 is connected to the display apparatus 100, i.e., an existing device, to serve as an extension device.

The display apparatus 100 and the upgrade apparatus 200, connected to each other, transmit and receive image signals, including broadcast signals and control signals, including various types of data and power.

The display apparatus 100 processes an image signal provided from an external image source 300 according to a preset image processing process to display an image.

In the system 1 of the present embodiment, the display apparatus 100 is configured as a TV which displays broadcast images based on broadcast signals, broadcast information, or broadcast data received from a transmitter of a broadcasting station. However, the display apparatus 100 may be configured as various types of devices which are capable of displaying images, without being limited to a TV.

The display apparatus 100 may display any type of image, without being limited to broadcast images. For example, the display apparatus 100 may display images, such as videos, still images, applications, on-screen display (OSD) based on signals or data received from various types of image sources (not shown), and graphic user interface (GUI) for controlling various operations.

The upgrade apparatus 200 is connected to the display apparatus 100 to communicate with the display apparatus. The upgrade apparatus 200 may provide a function which is not supported by the display apparatus 100. For example, the upgrade apparatus 200 may run an application not executable by the display apparatus 100. The application may also be displayed on a display unit 130 of the display apparatus 100. Alternatively, the upgrade apparatus 200 may provide a function which improves an existing operation of the display apparatus 100. For example, the upgrade apparatus 200 may include an upgraded configuration than hardware or software provided in the display apparatus 100. Therefore, an image signal may be processed with the upgraded configuration, thereby displaying an image with improved quality.

The upgrade apparatus 200 may be a device to upgrade hardware of a TV, e.g., an image processing circuit, and be detachable from the display apparatus 100. The upgrade apparatus 200 may be connected to the display apparatus 100 via a cable or wirelessly. In the present embodiment, the upgrade apparatus 200 is connected to the display apparatus 100 via a cable, thereby enabling transmission and reception of data, information, signals, or power between the upgrade apparatus 200 and the display apparatus 100. The upgrade apparatus 200 and the display apparatus 100 respectively include connectors or terminals (not shown) for physical or electrical connection to each other.

Alternatively, the upgrade apparatus 200 may be connected to the display apparatus 100 wirelessly. In this case, the upgrade apparatus 200 is supplied with operating power from a separate external power source or battery. However, the present embodiment is described with reference to a case where the upgrade apparatus 200 is connected to the display apparatus 100 via a cable.

The display apparatus 100 may only process an image signal received from the outside according to a preset image processing process and display an image based on the image signal.

In one exemplary embodiment, the display apparatus 100 may be configured as a smart TV. The smart TV is a TV capable of receiving and displaying a broadcast signal in real time, having a web browsing function to retrieve and use various contents through the Internet while displaying a broadcast signal in real time, and providing a user interface for these operations. Further, the smart TV may include an open software platform to provide a two-way service to a user. Thus, the smart TV may provide various contents, e.g., applications of providing predetermined services, to a user through the open software platform. These applications are application programs providing various types of services, e.g., SNS, financial, news, map, music, movie, game and electronic book services. When the display apparatus 100 is configured as a smart TV, the display apparatus 100 may be functionally divided into a first block receiving and processing a broadcast signal and an image signal and a second block providing an Internet service through a web browser and an application through an open software platform. The upgrade apparatus 200 may be configured to upgrade a function of the second block among the divided blocks of the display apparatus 100. Accordingly, when the upgrade apparatus 200 is connected to the display apparatus 100, the function providing the Internet service or the application may be conducted by the upgrade apparatus 200.

According to the present embodiment, as the upgrade apparatus 200 is connected to the display apparatus 100, hardware or software of the display system 1 performing the image processing process is upgraded. The upgrade apparatus 200 receives and processes an image signal from the display apparatus 100 and transmits the processed image signal to the display apparatus 100. The display apparatus 100 displays an image corresponding to the image signal received from the upgrade apparatus 200. Accordingly, a user may be provided with the image with relatively improved quality.

Figure 2:
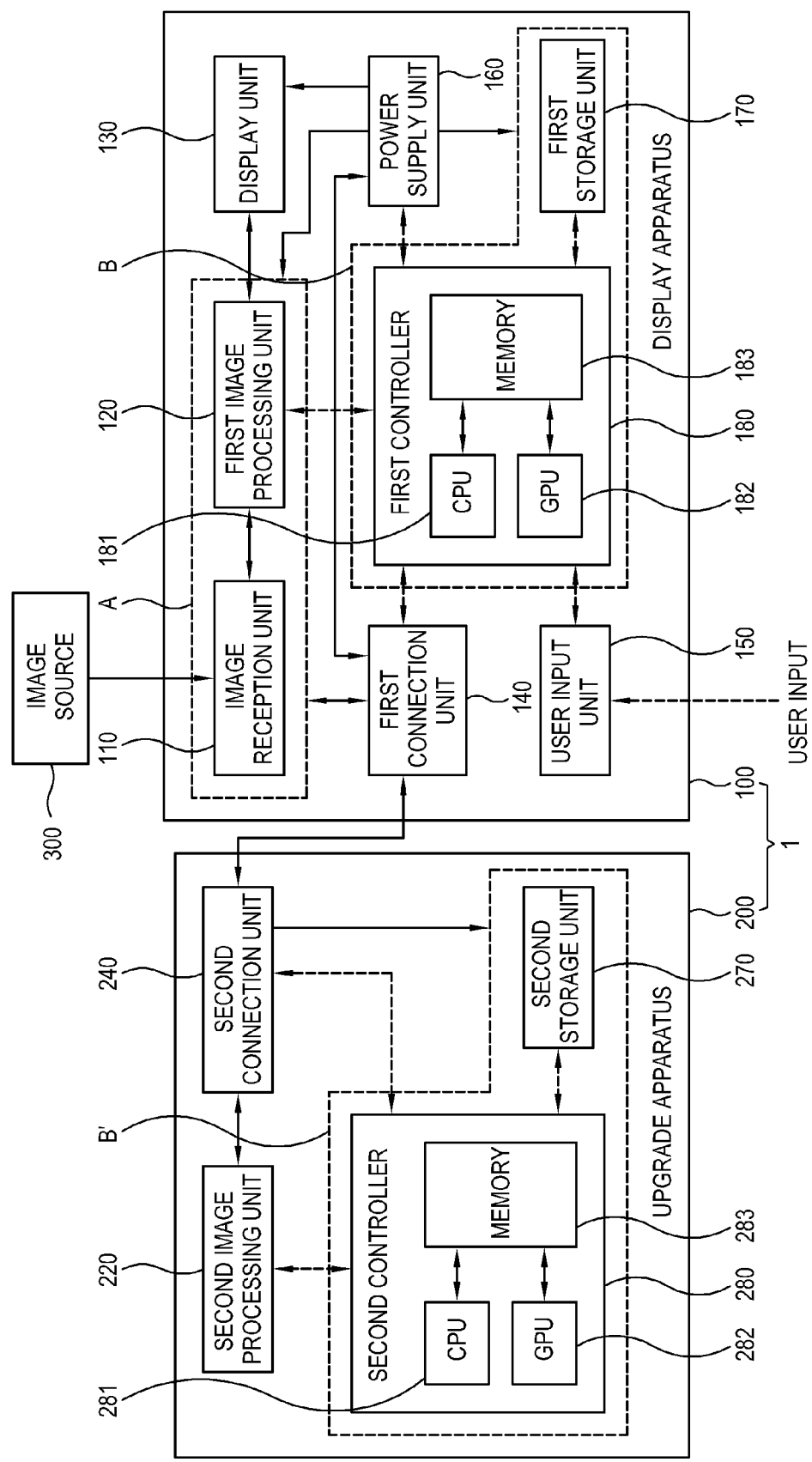
FIG. 2 is a block diagram illustrating configurations of a display apparatus and an upgrade apparatus of the display system according to an exemplary embodiment.

FIG. 2 is a block diagram illustrating configurations of the display apparatus 100 and the upgrade apparatus 200 constituting the display system 1 according to the present embodiment.

As shown in FIG. 2, the display apparatus 100 includes an image reception unit 110 to which at least one image source 300 is connected, a first image processing unit 120 processing an image signal received from the image source 300, a display unit 130 displaying an image based on an image signal, a first connection unit 140 connected to a peripheral device including the upgrade apparatus 200, a user input unit 150 outputting a preset command according to input by a user, a power supply unit 160 providing power, a first storage unit 170 storing unlimited data or information, and a first controller 180 controlling operations of all components of the display apparatus 100.

The image reception unit 110 transmits an image signal received from the at least one image source 300 to the first image processing unit 120.

The image reception unit 110 may receive a broadcast signal transmitted from a transmitter (not shown) of a broadcasting station. For example, the image reception unit 110 may include an antenna (not shown) and/or a tuner (not shown) to receive the broadcast signal. Further, the image reception unit 110 is an input/output (I/O) device receiving an image signal from the external image source 300. The external image source 300 is configured variously, corresponding to standards of received image signals or kinds of the image source 300 and the display apparatus 100. For example, the image reception unit 110 may receive signals/data in accordance with the high definition multimedia interface (HDMI), USB, and component standards. The image reception unit 110 may include a plurality of connection terminals (not shown) corresponding to the respective standards.

The first image processing unit 120 performs various preset image processing processes on an image signal received from the image reception unit 110. The first image processing unit 120 outputs a processed image signal to the display unit 130, such that an image based on the image signal is displayed on the display unit 130.

The first image processing unit 120 may perform any type of image processing. For example, a type of image processing may include at least one of demultiplexing, to separate a signal into characteristic signals, decoding, corresponding to an image format of an image signal, de-interlacing, which converts an interlaced image signal into a progressive form, scaling, which adjusts an image signal to a preset resolution, noise reduction, which improves image quality, detail enhancement, and frame refresh rate conversion.

The first image processing unit 120 may further include an audio signal processing unit (not shown) processing an audio signal in addition to conducting the image processing. Accordingly, the display apparatus 100 may further include a speaker (not shown) to output a sound corresponding to an audio signal processed by the audio signal processing unit.

The first image processing unit 120 may be provided as an image processing board (not shown) in which a circuit system including various chip sets (not shown), a memory (not shown), electronic components (not shown), and wiring (not shown) to conduct such processes, is mounted on a printed circuit board (PCB, not shown).

Alternatively, the image reception unit 110 and the first image processing unit 120 may form a single physical block unit A, as shown in FIG. 2. The single physical block unit A is configured as a board in which a circuit system, including various chip sets, electronic components and wiring is mounted on a PCB.

The display unit 130 displays an image based on an image signal output from the first image processing unit 120. The display unit 130 may be configured in various display types using liquid crystals, plasma, light emitting diodes, organic light emitting diodes, a surface conduction electron emitter, a carbon nano-tube, nano-crystals, etc. However, various display types are not limited.

The display unit 130 may further include an additional element, depending on a display mode. For example, in a display mode using liquid crystals, the display unit 130 may include a liquid crystal display (LCD) panel (not shown), a backlight unit (not shown) providing light to the panel, and a panel drive board (not shown) driving the panel.

When any one program of the first storage unit 170 is executed by the first controller 180, the display unit 130 may display an execution result of the program. Further, when the upgrade apparatus 200 is connected via the first connection unit 140 and any one program of a second storage unit 270 of the upgrade apparatus 200 is executed by a second controller 280, the display unit 130 may display an execution result of the program.

The first connection unit 140 may be configured as an interface which the upgrade apparatus 200 is connected. The first connection unit 140 may include an interface to enable transmission and reception of various data signals, image signals, control signals and power between the display apparatus 100 and the upgrade apparatus 200. For example, the first connection unit 140 may include connection terminals in accordance with HDMI or component standards for transmission and reception of image signals or a USB terminal (not shown) for transmission and reception of data signals, control signals, or power.

All signals transmitted from the display apparatus 100 to the upgrade apparatus 200 may be encoded for security purposes. The encoded signals are decoded and then processed in the upgrade apparatus 200.

An external device connected to the first connection unit 140 is not limited to the upgrade apparatus 200. Any device capable of transmitting or receiving signals or data to or from the display apparatus 100 through the first connection unit 140 may be connected to the first connection unit 140.

The user input unit 150 transmits various preset control commands or unlimited information to the first controller 180 by a user manipulation and input. Further, the user input unit 150 may transmit input by the user selection to the upgrade apparatus 200 through the first connection unit 140.

The user input unit 150 may be provided as either a menu key and an input panel, installed on an outside of the display apparatus 100, or as a remote controller, separate from the display apparatus 100.

Alternatively, the user input unit 150 may be configured as a single body with the display unit 130. In other words, if the display unit 130 is a touch screen, a user may transmit a preset command to the first controller 180 through an input menu (not shown) displayed on the display unit 130.

The power supply unit 160 may supply power to the respective components of the display apparatus 100. Further, when the upgrade apparatus 200 is connected to the display apparatus 100 through the first connection unit 140, the power supply unit 160 may supply power necessary to operate the upgrade apparatus 200. The power supply unit 160 may convert and supply commercial AC power input from the outside to the respective components of the display apparatus 100 and/or components of the upgrade apparatus 200.

In the present embodiment, when the upgrade apparatus 200 is not connected to the first connection unit 140, the power supply unit 160 may supply power to the respective components of the display apparatus 100 under control of the first controller 180. When the upgrade apparatus 200 is connected to the first connection unit 140, the power supply unit 160 may supply power to the respective components of the display apparatus 100 and/or the respective components of the upgrade apparatus 200 under control of a second controller 280 of the upgrade apparatus 200.

The first storage unit 170 stores unlimited data according to control of the first controller 180. Data to be stored in the first storage unit 170 may include, for example, an operating system (OS) to run the display apparatus 100 and various applications, image data, and optional data executable in the OS.

The first storage unit 170 stores at least one program to conduct a predetermined function. For example, the first storage unit 170 stores a first OS, a first web browser, a first open software platform, and a plurality of applications selected and downloaded by a user through the open software platform. The first storage unit 170 stores various programs illustrated above and version information on the respective programs.

The first storage unit 170 is configured as a nonvolatile memory, such as a flash memory and a hard disk drive. The first storage unit 170 is accessed by the first controller 180, and the data stored in the first storage unit 170 may be read, recorded, revised, deleted, or updated by the first controller 180. The first storage unit 170 may store data processed by the first controller 180.

Alternatively, when the upgrade apparatus 200 is connected through the first connection unit 140, the first storage unit 170 may be accessed by the upgrade apparatus 200, and the data stored in the first storage unit 170 may be read, recorded, revised, deleted, or updated by the second controller 280.

The first controller 180 performs control operations of various components of the display apparatus 100. For example, the first controller 180 conducts an image processing process of the first image processing unit 120, transmission and reception of signals, information, or data through the first connection unit 140, and a control operation in response to a command from the user input unit 150. Thus, the first controller 180 controls general operations of the display apparatus 100.

The first controller 180 is configured as a central processing unit (CPU) 181 to run at least one program stored in the first storage unit 170. The first controller 180 runs at least one program corresponding to a selection of a user input through the user input unit 150, and controls the display unit 130 to display the program.

The first controller 180 may further include a first graphic processing unit (GPU) 182 serving the CPU 181 and a memory 183, such as a DDR memory (RAM). The first GPU 182 enhances graphics performance of the display apparatus 100 and may accelerate a standard graphics library, such as Open GL or OpenGL ES, through hardware. The first GPU 182 supports a programmable pipeline, and a user may utilize the first GPU 182 for various graphic applications using a shader program.

The first GPU 182 conducts post-processing on an image signal processed by the first image processing unit 120 or a second image processing unit 220. Post-processing may include various types of image processing, e.g., processing with a graphic application, such as a GUI, image quality enhancement, definition enhancement, image filtering, giving a sepia effect, and 2D-3D conversion (stereoscopy). Since a user may implement various image processing algorithms through shader programming, any post-processing function may be employed as long as the first GPU 182 can perform the function.

An image signal, output from the first GPU 182, is combined with an image signal output from the first image processing unit 120 or the second image processing unit 220, and displayed on the display unit 130.

In another exemplary embodiment, the first storage unit 170 and the first controller 180 may form a single physical block unit B in FIG. 2. The single physical block unit B is configured as a board in which a circuit system including various chip sets, electronic components, and wiring is mounted on a PCB.

The display apparatus 100, having the foregoing configuration, needs upgrading over time due to various factors, such as technology development. Upgrading is necessary for various cases. For example, upgrading is necessary receive an image signal in a new format, which was not proposed or supported when the display apparatus 100 was first manufactured. Therefore, upgrading is necessary to receive an image signal with a higher level than image signals supported the display apparatus 100. Therefore, the image signal with the higher level may satisfy a trend towards a demand for high-quality images, or system load reduction requirements of the display apparatus 100.

Upgrading the display apparatus 100 may be carried out in terms of hardware and software. In the present embodiment, the upgrade apparatus 200 provided to upgrade the display apparatus 100 is connected to the first connection unit 140, thereby upgrading at least one of the existing hardware and software configurations of the display apparatus 100.

The upgrade apparatus 200 includes hardware or software configurations corresponding to at least part of hardware or software resources of the display apparatus 100. These hardware or software configurations of the upgrade apparatus 200 are provided to perform more functions than the at least part of the resources of the display apparatus 100. These additional functions may improve the overall functionality of the display apparatus. When the upgrade apparatus 200 is connected to the display apparatus 100, the hardware or software configurations of the upgrade apparatus 200 replace at least part of the existing resources of the display apparatus 100. Therefore, when the upgrade apparatus 200 is connected to the display apparatus 100, image quality of an image displayed on the display apparatus 100 may be improved.

In the present embodiment, as the upgrade apparatus 200 has control and replaces the display apparatus 100 in terms of hardware of the display apparatus 100, such as the first storage unit 170, the first CPU 181, the first GPU 182, a 2D graphic accelerator, etc., become idle.

In a first exemplary embodiment, supply of power to the first storage unit 170 and the second controller 180, which are idle, is selectively blocked. Therefore, in the embodiments unnecessary power consumption is prevented.

Further, in a second exemplary embodiment, an image signal is post-processed using the first GPU 182, which is idle. Therefore, utilization of the idle resource is increased and image quality is enhanced without decreasing basic graphic output performance of the main device, the upgrade apparatus 200.

Hereinafter, the configuration of the upgrade apparatus 200 will be described.

The upgrade apparatus 200 includes the second image processing unit 220 capable of performing processes corresponding to at least part of the image processing processes of the first image processing unit 120, a second connection unit 240 connected to the first connection unit 140 of the display apparatus 100, a second storage unit 270 storing unlimited data or information, and a second controller 280 controlling general operations of the upgrade apparatus 200.

The second image processing unit 220 may perform a second process corresponding to a first process, which is part of the processes performed by the first image processing unit 120 of the display apparatus 100. The terms "first process" and "second process" are named only for convenience to distinguish the processes from each other, and such processes may be a single unit process or a plurality of unit processes. The second process is functionally improved, as compared with the first process, and is achieved by upgrading hardware, such as a chip set, or software, such as algorithms or executable codes or programs.

The second image processing unit 220 performs the second process, instead of the first process, according to control by the first controller 180 or the second controller 280, when the display apparatus 100 and the upgrade apparatus 200 are connected. In this manner, the second process, which is more functionally improved than the first process, is implemented instead of the first process, thereby enhancing the image processing process.

The second connection unit 240 is connected to the first connection unit 140, thereby enabling communication between the upgrade apparatus 200 and the display apparatus 100. The second connection unit 240 may be connected to at least one of a plurality of connection terminals (not shown) of the first connection unit 140. The second connection unit 240 is provided in a standard, corresponding to the first connection unit 140, so as to connect to the first connection unit 140. Thus, the second connection unit 240 may be configured as an interface, corresponding to the first connection unit 140, to enable transmission and reception of various data signals, image signals, control signals and power between the upgrade apparatus 200 and the display apparatus 100. For example, the second connection unit 240 may include connection terminals in accordance with HDMI or component standards for transmission and reception of image signals or a USB terminal (not shown) for transmission and reception of data signals, control signals, or power.

For example, the second connection unit 240 may be connected to an HDMI terminal (not shown) for transmission and reception of image signals between the display apparatus 100 and the upgrade apparatus 200 or to a USB terminal (not shown) for transmission and reception of data and power among the connection terminals of the first connection unit 140. However, the first connection unit 140 and the second connection unit 240 may be connected in various modes, without being limited to the above examples.

The second storage unit 270 stores unlimited data. The second storage unit 270 is configured as a nonvolatile memory, such as a flash memory and a hard disk drive. The second storage unit 270 is accessed by the second controller 280. The data stored in the second storage unit 270 is read, recorded, revised, deleted, or updated by the second controller 280. The second storage unit 270 may store data processed by the second controller 280. Meanwhile, the second storage unit 270 may also be accessed, by not only the second controller 280, but the first controller 180 depending on a configuration thereof.

The second storage unit 270 stores an upgraded version of at least one program stored in the first storage unit 170. For example, the second storage unit 270 stores a second OS that is an upgraded version of the first OS, a second web browser that is an upgraded version of the first web browser, a second open software platform that is an upgraded version of the first open software platform, and a plurality of applications selected and downloaded by a user through the second open software platform. The second storage unit 270 stores various programs illustrated above and version information on the respective programs.

The second controller 280 conducts control operations of various components of the upgrade apparatus 200 to perform general image processing processes. For example, the second controller 280 conducts an image processing process of the second image processing unit 220 and transmission and reception of signals, information, or data through the second connection unit 240. Therefore, the second controller 280 controls general operations of the upgrade apparatus 200.

The second controller 280 runs at least one program stored in the second storage unit 270. The second controller 280 runs at least one program, corresponding to a selection of a user input through the user input unit 150, and controls the display unit 130 to display the program. Further, the second controller 280 may conduct transmission and reception of signals, information, or data through the second connection unit 240, and a control operation in response to a command from the user input unit 150.

In another exemplary embodiment, the second storage unit 270 and the second controller 280 may form a single physical block unit B' in FIG. 2. The single physical block unit B' in FIG. 2 is configured as a board in which a circuit system including various chip sets, electronic components and wiring is mounted on a PCB.

The second controller 280 and the first controller 180 may be configured as CPUs 281 and 181, respectively. Thus, if the second controller 280 performs a more improved function than the first controller 180, the second controller 280 may disable the first controller 180 and control general operations of the display system 1, instead of the first controller 180. Alternatively, the second controller 280 may control the general operations of the display system 1 together with the first controller 180.

The second controller 280 may further include a second GPU 282 serving the CPU 281 and a memory 283, such as a DDR memory (RAM). The second GPU 282 performs various graphic processes, including post-processing and GUI processing, on an image signal processed by the second image processing unit 220 or the first image processing unit 120.

The second GPU 282 enhances graphics performance of the upgrade apparatus 200 and may accelerate a standard graphics library, such as Open GL or OpenGL ES, through hardware. The second GPU 282 supports a programmable pipeline, and a user may utilize the second GPU 282 for various graphic applications using a shader program.

The second GPU 282 conducts post-processing on an image signal processed by the first image processing unit 120 or the second image processing unit 220. Post-processing may include various types of image processing, for example, image quality enhancement, definition enhancement, image filtering, giving a sepia effect, and 2D-3D conversion (stereoscopy). Since a user may implement various image processing algorithms through shader programming, any post-processing function may be employed as long as the second GPU 282 can perform the function.

According to the first exemplary embodiment, when the upgrade apparatus 200 is connected to the display apparatus 100 through the second connection unit 240, the second controller 280 may control the power supply unit 160 of the display apparatus 100.

When the upgrade apparatus 200 is connected to the display apparatus 100 through the second connection unit 240 and the first connection 140, the second controller 280 may control the power supply unit 160 based on a preset setting. For example, when the upgrade apparatus 200 is connected to the display apparatus 100, the second controller 280 may control the power supply unit 160 based on a default setting to block supply of power to the first storage unit 170 and the first controller 180. Basically, the second storage unit 270 stores an upgraded version of at least one program of the first storage unit 170. Thus, when a program of the second storage unit 270 is executed, an upgraded service may be provided. Further, since the first storage unit 170 and the second storage unit 270 store programs providing the same or similar functions, it is uneconomical in terms of power consumption to supply power to both of the storage units 170 and 270.

In the first exemplary embodiment, even though the upgrade apparatus 200 is connected to the display apparatus 100 through the second connection unit 240 and the first connection unit 140, the first controller 180 or the second controller 280 may control the power supply unit 160 based on a user selection through the user input unit 150.

In the first exemplary embodiment, when a power saving mode of the display apparatus 100 is selected through the user input unit 150, the second controller 280 may control the power supply unit 160 to block supply of power to the first storage unit 170 and the first controller 180.

In the first exemplary embodiment, the second controller 280 may control the power supply unit 160 to selectively block supply of power either to the first storage unit 170 and the first controller 180 of the display apparatus 100, or to the upgrade apparatus 200. For example, when a first user selection is input through the user input unit 150, the first user selection is transmitted to the second controller 280 through the second connection unit 240. The second controller 280 determines whether the first user selection is executable by a program of the first storage unit 170 or by a program of the second storage unit 270. As a result, when the first user selection is determined to be executable by the program of the second storage unit 270, and not by the program of the first storage unit 170, the second controller 280 controls the power supply unit 160 to block supply of power to the first storage unit 170 and the first controller 180. Alternatively, when the first user selection is determined to be executable by the program of the first storage unit 170, the second controller 280 controls the power supply unit 160 to supply power to the first storage unit 170 and the first controller 180, and controls the upgrade apparatus 200 to be in a sleep mode, a power saving mode or blocks supply of power to the upgrade apparatus 200. Thus, the upgrade apparatus is turned off when the power supply is blocked. Accordingly, a power saving effect is achieved. For example, when the first user selection is a command to run an application, the second controller 280 checks version information on the application, corresponding to the first user selection, and determines whether the application is executable by the first OS stored in the first storage unit 170 based on the checked version information. As a result, when the application is determined to be executable by the first OS, the second controller 280 controls the power supply unit 160 to save power, thereby placing the upgrade apparatus 200 in a sleep mode or power saving mode or blocking supply of power to the upgrade apparatus 200. Thus, the upgrade apparatus is turned off when the supply of power is blocked. When the application is determined to be executable by the second OS of the second storage unit 220, and not by the first OS, the second controller 280 controls the power supply unit 160 to save power, thereby blocking supply of power to the first storage unit 170 and the first controller 180.

Alternatively, the second controller 280 may control the power supply unit 160 to supply power both to the first storage unit 170 and the first controller 180 of the display apparatus 100, and to the upgrade apparatus 200. For example, when a second user selection is input through the user input unit 150, the second user selection is transmitted to the second controller 280 through the second connection unit 240. When the second user selection runs a program of the first storage unit 170 and a program of the second storage unit 270 at the same time, the second controller 280 may control the power supply unit 160 to supply power both to the first storage unit 170 and the first controller 180 of the display apparatus 100, and to the upgrade apparatus 200. For example, when the second user selection includes a picture-in-picture (PIP) function or a picture-by-picture (PBP) function, any application stored in the first storage unit 170 is displayed as a main screen and any application stored in the second storage unit 270 is displayed as a sub-screen.

Even though the second controller 280 controls power supply to the first storage unit 170 and the first controller 180 and/or the upgrade apparatus 200, power may be supplied to the image reception unit 110, the image processing unit 120, and the display unit 130 of the display apparatus 100 all the time. In other words, the second controller 280 does not have control over supply of power to components involved in processing and displaying a broadcast signal of the display apparatus 100, or an image signal from an external image source.

According to a modification of the first exemplary embodiment, the second controller 280 may control the power supply unit 160 to selectively supply power to the first image processing unit 120 of the display apparatus and the second image processing unit 220 of the upgrade apparatus 200. For example, when a 3D image signal is received through the image reception unit 110, the first image processing unit 120 is not capable of processing the 3D image signal, but the second image processing unit 220 is capable of processing the 3D image signal, and the second controller 280 may control the power supply unit 160 to block power supplied to the first image processing unit 120.

Further, the second controller 280 may control the power supply unit 160 to supply power both to the first image processing unit 120 of the display apparatus 100 and to the second image processing unit 220 of the upgrade apparatus 200.

With this configuration, the upgrade apparatus 200 according to the first exemplary embodiment may upgrade the display apparatus 100, and prevent unnecessary power consumption with respect to idle resources.

Hereinafter, a control method of the display system according to the first exemplary embodiment will be described with reference to FIG. 3.

Figure 3:
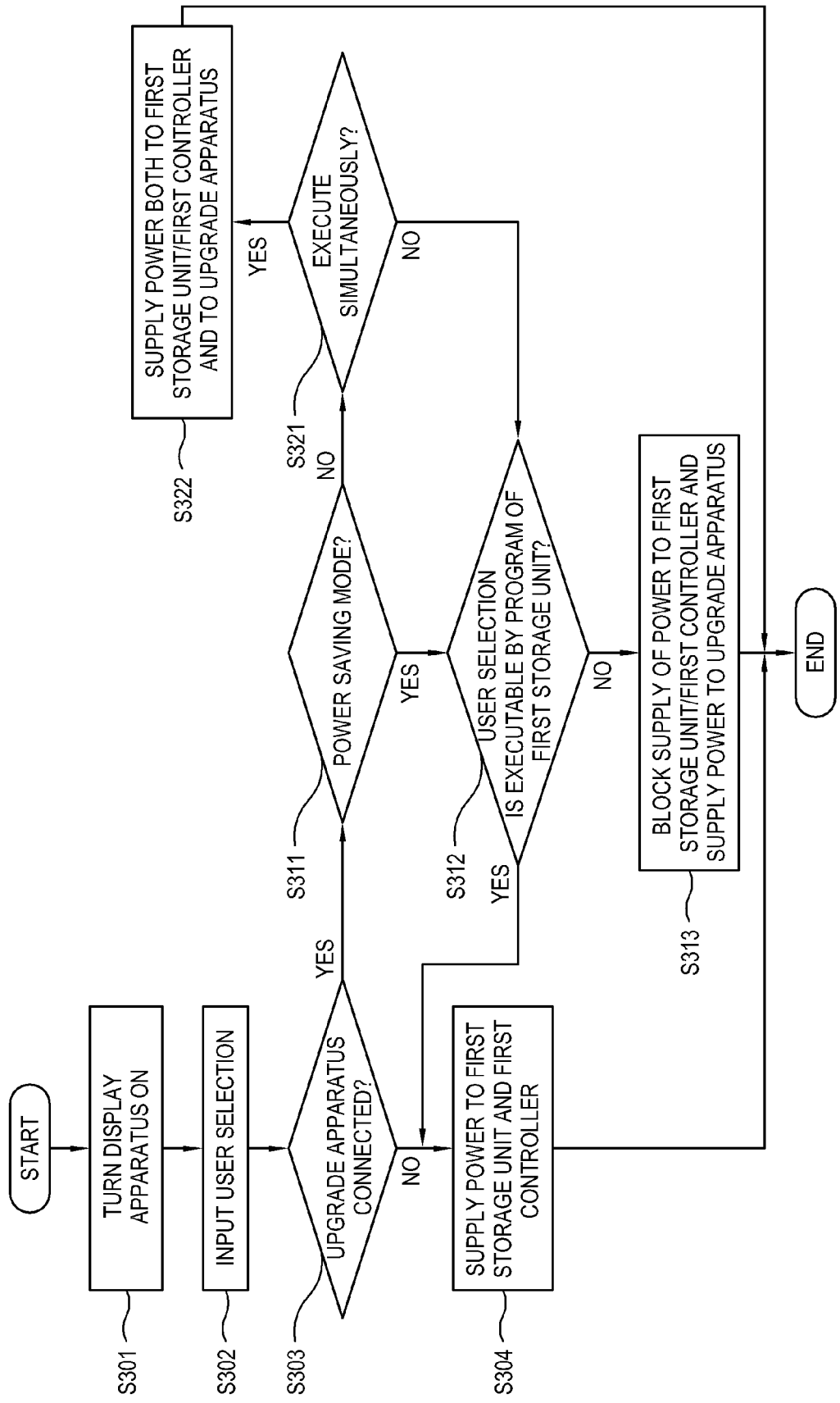
FIG. 3 is a flowchart illustrating a control method of the display system according to a first exemplary embodiment.

FIG. 3 is a flowchart illustrating the control method of the display system according to the first exemplary embodiment.

As shown in FIG. 3, power of the display apparatus 100 is turned on (S301), and a user selection is input through the user input unit 150 (S302).

In the embodiments, a determination is made to determine whether the upgrade apparatus 200 is connected to the display apparatus 100 through the first connection unit 140 (S303). As a result, when the upgrade apparatus 200 is not connected to the display apparatus 100, the power supply unit 160 is controlled by the first controller 180 to supply power to the first storage unit 170 and the first controller 180 (S304).

In operation S303, when the upgrade apparatus 200 is connected to the display apparatus 100, a determination is made whether a power saving mode of the display apparatus 100 is selected (S311). When the power saving mode is selected in operation S311, the second controller 280 of the upgrade apparatus 200 identifies whether the input user selection in operation S302 is executable by a program of the first storage unit 170 (S312).

When the user selection is executable by the program of the first storage unit 170 in operation S312, the second controller 280 supplies power to the first storage unit 170 and the first controller 180 (S304). The second controller 280 may control the power supply unit 160 to block supply of power to the upgrade apparatus 200.

In operation S312, when the user selection is executable by a program of the second storage unit 270, not by the program of the first storage unit 170, the second controller 280 controls the power supply unit 160 to block supply of power to the first storage unit 170 and the first controller 180 and to supply power to the upgrade apparatus (S313).

When the power saving mode of the display apparatus 100 is not set in operation S311, a determination is made whether the user selection in operation S302 is a command to run the program of the first storage unit 170 and the program of the second storage unit 270 at the same time (S321).

When the user selection is a command to run the programs at the same time in operation S321, the second controller 280 controls the power supply unit 160 to supply power both to the first storage unit 170 and the first controller 180, and to the upgrade apparatus 200 (S322).

In a second exemplary embodiment, when the upgrade apparatus 200 is connected to the display apparatus 100 through the second connection unit 240, an image signal may be post-processed using the GPU 182 of the display apparatus 100 and the GPU 282 of the upgrade apparatus 200, which are idle, while supplying power both to the display apparatus 100 and the upgrade apparatus 200.

A case where the display apparatus 100 is upgraded by the upgrade apparatus 200 according to the second exemplary embodiment will be described in detail with reference to FIGS. 4 and 5.

Figure 4:
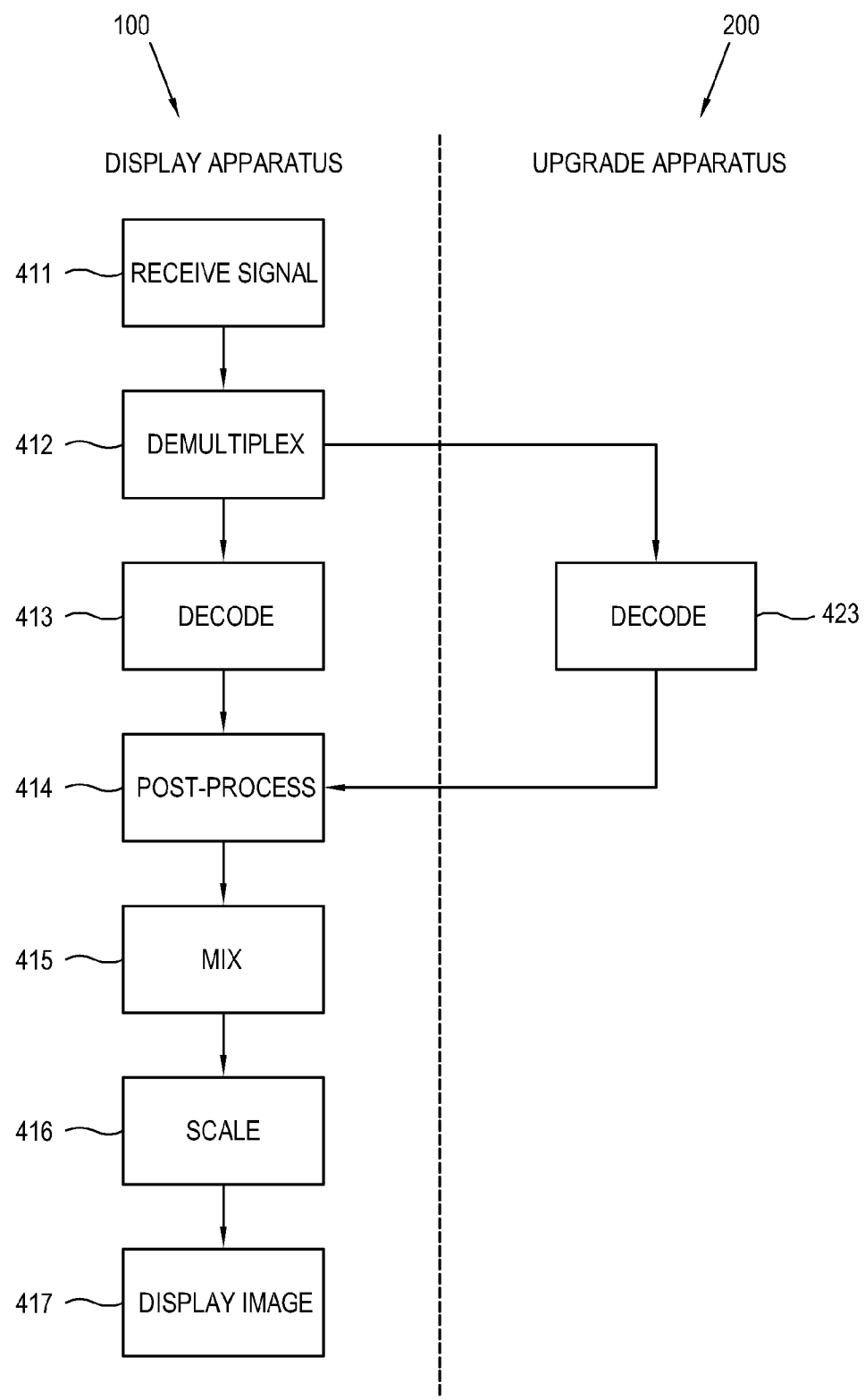
FIGS. 4 and 5 illustrate a method of upgrading an image processing process of the display apparatus by the upgrade apparatus in the display system of FIG. 2.

FIG. 4 is a flowchart illustrating a method of upgrading an image processing process of the display apparatus 100 by the upgrade apparatus 200 in the display system 1 according to the second exemplary embodiment.

As shown in FIG. 4, when receiving a signal, e.g., a broadcast signal from the image source 300 (411), the display apparatus 100 processes the signal according to a preset sequence of image processing processes 412, 413, 414, 415 and 416. It should be noted that FIG. 4 illustrates only some image processing processes 412, 413, 414, 415 and 416 for concise description of the present embodiment. However, FIG. 4 does not show all of the image processing processes implemented by the display apparatus 100.

The display apparatus 100 performs demultiplexing to separate the received broadcast signal into an image signal, an audio signal, and optional data (412). The display apparatus 100 processes the respective demultiplexed signals. For example, decoding the image signal into a preset image format (413). The display apparatus 100 performs post-processing (graphic processing) on the decoded image signal (414) and mixing the post-processed image signal and the decoded image signal (415). The display apparatus 100 scales the mixed image signal to a predetermined resolution so as to be displayed as an image on the display unit 130 (416) and displays an image based on the scaled image signal (417).

Among these processes, the upgrade apparatus 200 is provided to perform a process 423, corresponding to the decoding process of the display apparatus 100. The decoding process 423 performed by the upgrade apparatus 200 is the same, in terms of action as the decoding process 413 performed by the display apparatus 100, but is functionally improved as compared with the decoding process 413 of the display apparatus 100. Thus, performing the decoding process 423, instead of the decoding process 413, upgrades the image processing process.

For example, the decoding process 423 can handle an image signal with high resolution or an image signal in a format which cannot be handled with the decoding process 413, or apply an additional effect to an image signal, which is not realized with the decoding process 413.

Accordingly, in the sequence of the image processing processes according to the present embodiment, the decoding process 423 of the upgrade apparatus 200 is carried out after demultiplexing 412, instead of the decoding process 413 of the display apparatus 100, according to control of the first controller 180 or the second controller 280. After the decoding process 423 of the upgrade apparatus 200, the post-processing process 414 by the GPU 182 of the display apparatus 100 is carried out. Subsequently, the mixing process 415, in which the post-processed image signal by the display apparatus 100 and the decoded image signal by the upgrade apparatus 200 are mixed, is carried out, and then scaling (414) is carried out.

According to this sequence, transmission or reception of image signals and control signals is carried out between the display apparatus 100 and the upgrade apparatus 200, which is realized according to control of the first controller 180 or the second controller 280.

Unlike in FIG. 4, where part of the image processing processes is replaced, the second image processing unit 220 of the upgrade apparatus 200 may replace the first image processing unit 120 of the display apparatus 100, which will be described with reference to FIG. 5. FIG. 5 is a block diagram illustrating a process of transmitting an image signal received to the image reception unit 110 in the display system 1, according to an exemplary embodiment.

Figure 5:
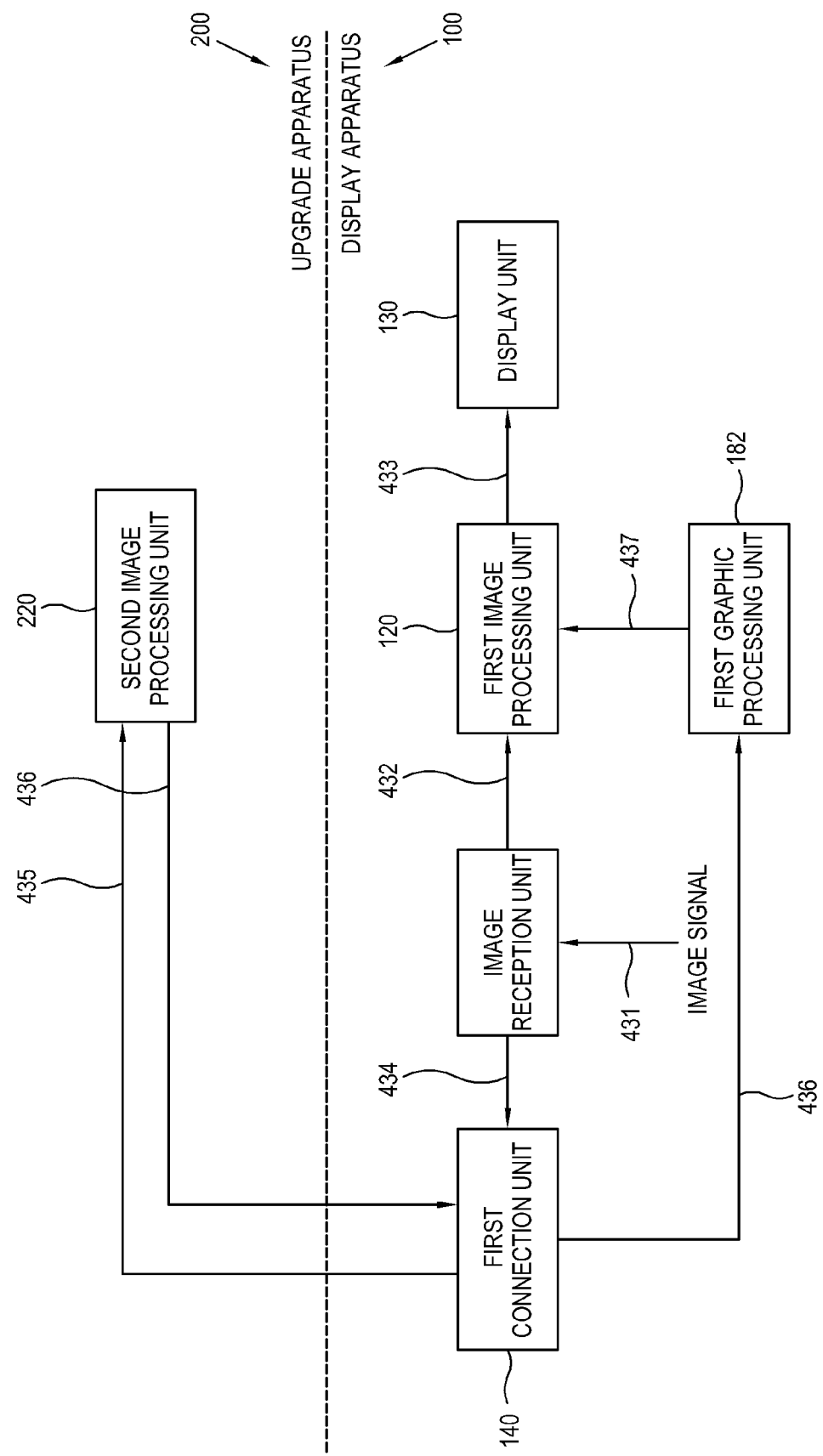

Referring to FIG. 5, when the upgrade apparatus 200 is not connected to the display apparatus 100, an image signal is received at the image reception unit 110 (431) and then transmitted to the first image processing unit 120 (432). The first image processing unit 120 processes the image signal and outputs the processed signal to the display unit 130 (433). Accordingly, the display unit 130 displays an image based on the image signal processed by the first image processing unit 120.

Meanwhile, when the upgrade apparatus 200 is connected to the display apparatus 100, an image signal is received at the image reception unit 110 (431) and then transmitted to the second image processing unit 220 (435), not to the first image processing unit 120 via the first connection unit 140 (434). The second image processing unit 220 performs an image processing process on the image signal, instead of the first image processing unit 120, and the image signal processed by the second image processing unit 220 is transmitted back to the display apparatus 100 (436).

The image signal processed by the second image processing unit 220 is transmitted to the first GPU 182 (437), post-processed by the first GPU 182, and transmitted to the first image processing unit 120 (438). The first image processing unit 220 transmits the signal to the display unit 130 via mixing and scaling (433). Accordingly, the display unit 130 displays an image based on the image signal processed by the second image processing unit 220 and the first GPU 182.

Meanwhile, when the display apparatus 100 and the upgrade apparatus 200 are connected, the second controller 280 may disable the first controller 180 and control the first image processing unit 120 and the second image processing unit 220. Alternatively, when the OS stored in the second storage unit 270 is a more upgraded version than the OS stored in the first storage unit 170, the OS of the first storage unit 170 may be updated to the OS of the second storage unit 270 to run the updated OS, or the OS of the second storage unit 270 may be run instead of the OS of the first storage unit 170.

With this configuration, the upgrade apparatus 200 according to the second embodiment may upgrade the display apparatus 100 and improve image quality using idle resources.

Hereinafter, processing an image frame in the display system 1, according to the second exemplary embodiment, will be described with reference to FIGS. 6 and 7.

Figure 6:
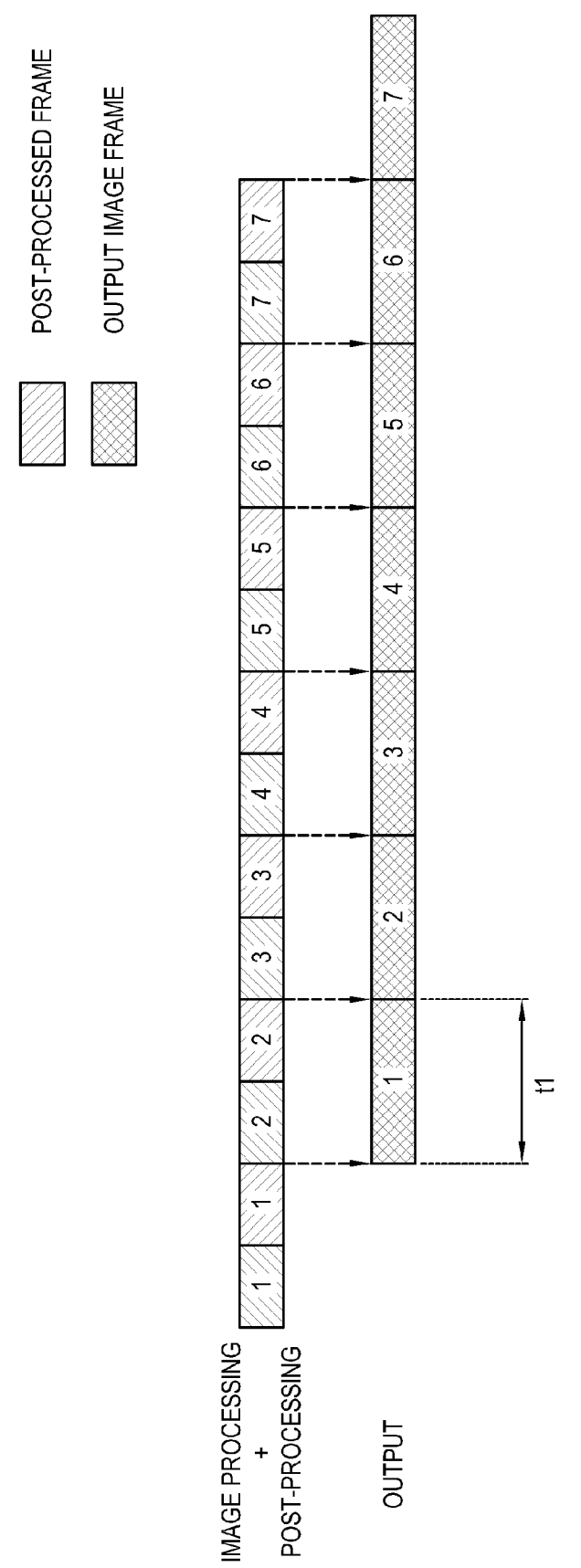
FIG. 6 illustrates an image frame subjected to image processing and post-processing by the upgrade apparatus.

FIG. 6 illustrates an image frame subjected to image processing and post-processing by the second image processing unit 220 and the second GPU 282 of the upgrade apparatus 200. FIG. 7 illustrates an image frame subjected to image processing by the second image processing unit 220 of the upgrade apparatus 200 and post-processing by the first GPU 182 of the display apparatus 100.

As shown in FIG. 6, when the upgrade apparatus 200 performs both image processing and post-processing, image processing and post-processing are sequentially carried out with respect to each one frame. In other words, the second controller 280 controls the second image processing unit 220 and the second GPU 282 to conduct image processing and post-processing with respect to a second frame after completely carrying out image processing and post-processing with respect to a first frame. Thus, it takes a time t1 to generate an output image with respect to one frame.

Figure 7:
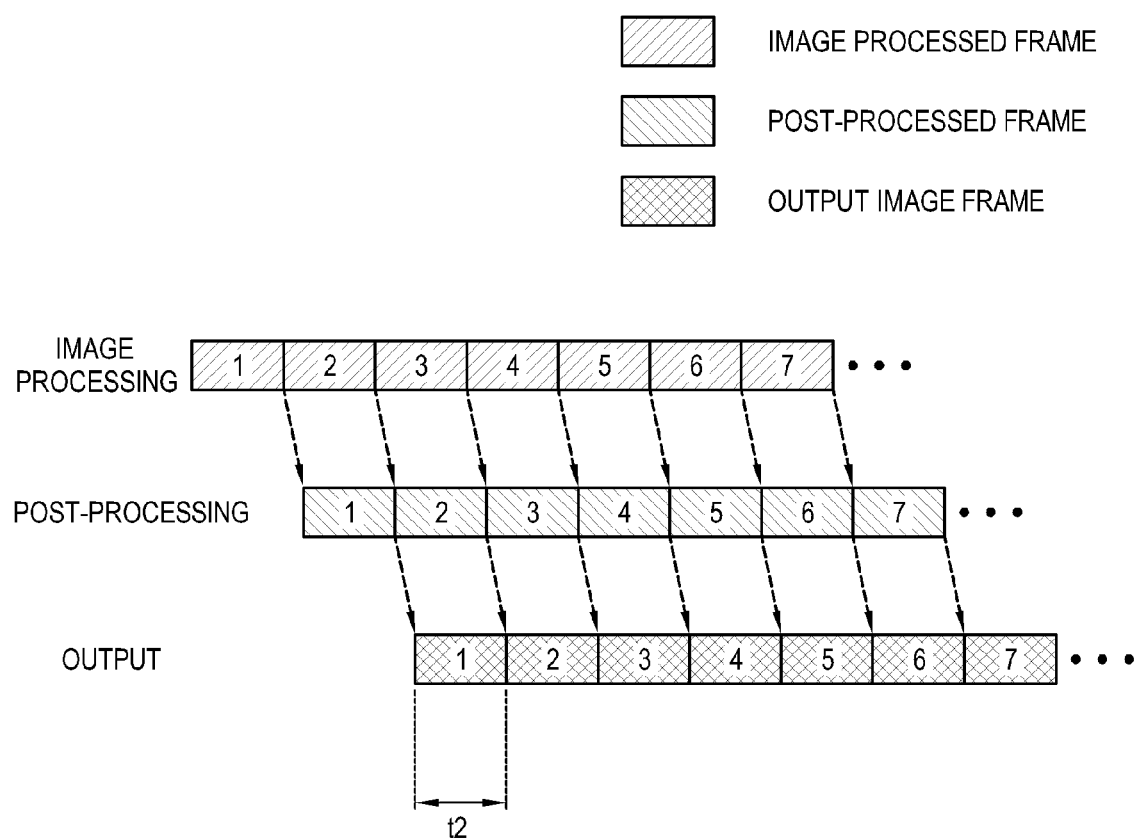
FIG. 7 illustrates an image frame subjected to image processing by the upgrade apparatus and to post-processing by the display apparatus.

As shown in FIG. 7, when the upgrade apparatus 200 conducts image processing and the display apparatus 100 conducts post-processing, image processing and post-processing with respect to one frame may be asynchronously carried out. In other words, post-processing by the first GPU 182 of the display apparatus 100 is carried out independently or asynchronously from operations of the second image processing unit 220 and the second GPU 282 of the upgrade apparatus 100.

When image processing with respect to the first frame is carried out, the second controller 280 controls the second image processing unit 220 to immediately conduct image processing with respect to the second frame, regardless of post-processing. Further, the first controller 180 controls the first GPU 182 to receive the processed image signal from the upgrade apparatus 200 and to immediately conduct post-processing on the image signal. Thus, it takes a time of t2, shorter than t1, to generate an output image with respect to one frame. Therefore, the output image with respect to one frame outputs an image with improved quality due to post-processing without decrease in frame rate.

Therefore, processing efficiency of the entire system is improved, when post-processing is carried out using an idle resource, as compared with when image processing and post-processing are carried out in a single device. Accordingly, in the present embodiment, graphic processing by an idle resource is added to an output pipeline, thereby obtaining a high-quality image via post-processing without deterioration in performance of the entire system.

Meanwhile, the present embodiment has been described with a case where the upgrade apparatus 200 is a main device having control and a component of the display apparatus 100 is employed as an idle resource. However, the display apparatus 100 may have control and the upgrade apparatus 200 may be employed as an idle resource. Also, although the GPU is illustrated as an idle resource in the present embodiment, any hardware configuration, e.g., CPU and 2D-GA, may be used as an idle resource.

Hereinafter, a control method of the display system 1, according to the second exemplary embodiment, will be described with reference to FIG. 8.

Figure 8:
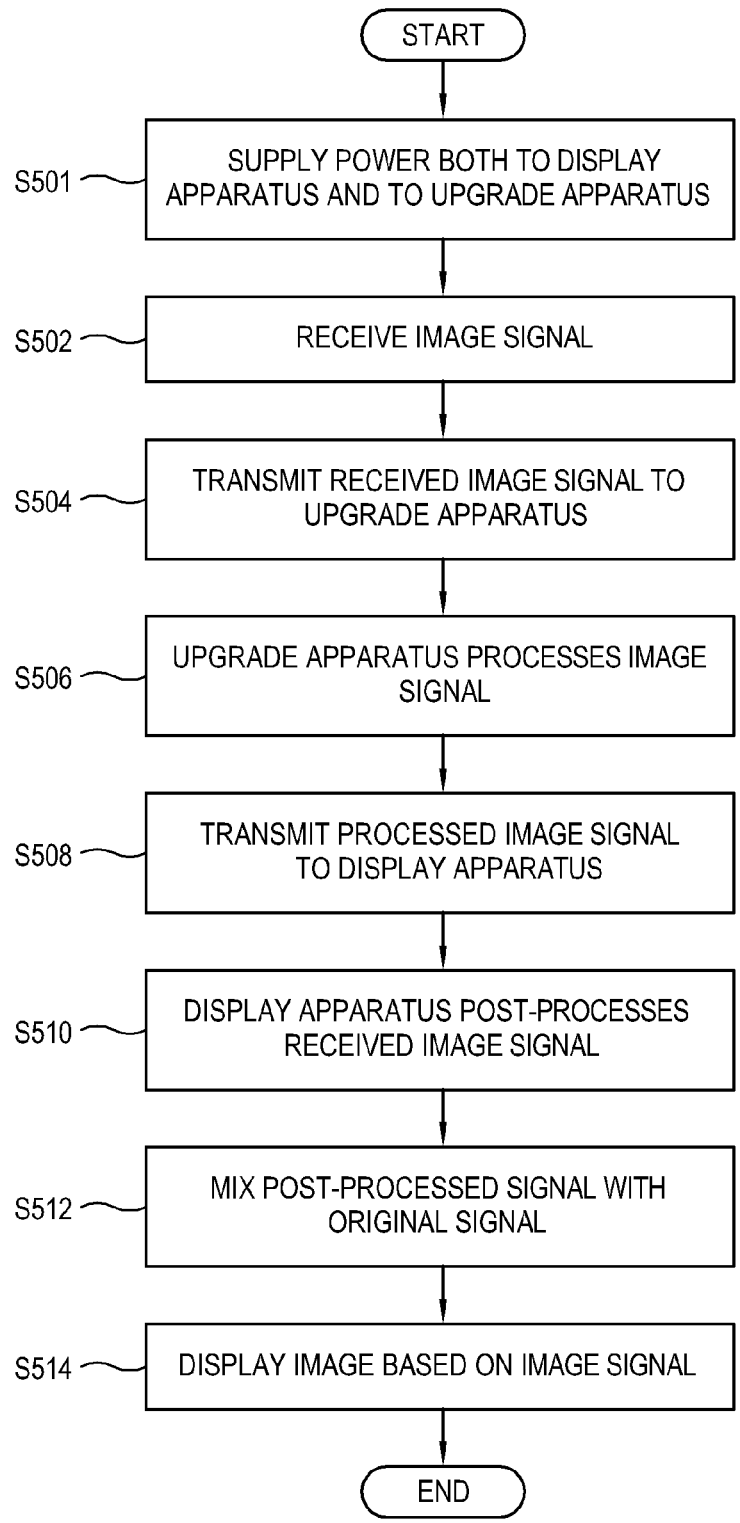
FIG. 8 is a flowchart illustrating a control method of the display system according to a second exemplary embodiment.

As shown in FIG. 8, when the upgrade apparatus 200 is connected to the first connection unit 140 of the display apparatus 100 to upgrade hardware or software, the second controller 280 may control the power supply unit 160 to supply power both to the display apparatus 100 and to the upgrade apparatus 200 (S501). Here, operation S501 may correspond to operation S322 in the first exemplary embodiment of FIG. 3.

The display apparatus 100 receives an image signal from the image source 300 (S502).

The first controller 180 transmits the received image signal to the upgrade apparatus 200, and the upgrade apparatus 200 receives the image signal (S504).

The second controller 280 of the upgrade apparatus 200 controls the second image processing unit 220 to process the image signal received from the display apparatus 100 (S506).

The second controller 280 transmits the processed image signal to the display apparatus 100 and the display apparatus 100 receives the image signal (S508).

The first controller 180 controls the first GPU 182 of the display apparatus 100, which is idle, to post-process the received image signal (S510).

The first controller 180 mixes the post-processed image signal in operation S510 and the original image signal received in operation S508 and scales the mixed signal (S512).

Then, the first controller 180 displays an image corresponding to the scaled image signal on the display unit 130 (S514).

In the embodiment with reference to FIG. 8, the upgrade apparatus 200 conducts image processes and the display apparatus 100 conducts post-processing. The display apparatus 100 may conduct image processing and the upgrade apparatus 200 may conduct post-processing.

As described above, according to the first embodiment, power of an idle resource is selectively blocked to prevent unnecessary power consumption. Further, an idle resource of which power is blocked, or supply of power to all components, may be determined based on a user selection and/or a program function, thereby improving efficiency of the system.

According to the second embodiment, when power is supplied to all components, post-processing is additionally carried out using an idle resource. Therefore, an improved high-quality image is obtained, while maintaining an operation speed without deterioration in system performance. Further, since a user may implement various image processing algorithms through shader programming, any post-processing function may be employed as long as the idle resource can perform the function.

In the embodiments, the first image processing unit 120 and the second image processing unit 220 may include hardware. Further, the first image processing unit 120 and the second image processing unit 220 in the embodiments may include a processor.

Although a few exemplary embodiments have been shown and described, it will be appreciated by those skilled in the art that changes may be made in these exemplary embodiments without departing from the principles and spirit of the embodiments, the scope of which is defined in the appended claims and their equivalents.

What is claimed is:

1. A display apparatus comprising:
    an image processing device which processes an image signal;
    a display device which displays an image based on the processed image signal;
    a connection device which connects to an upgrade apparatus which processes the image signal;
    a power supply device which supplies power to each component of the display apparatus and the upgrade apparatus through the connection device; and
    a first controller which controls the connection device to receive the processed image signal from the upgrade apparatus when the upgrade apparatus is connected through the connection device,
    wherein, in response to the upgrade apparatus being connected to the display apparatus through the connection device, the power supply device of the display apparatus is controlled by a second controller of the upgrade apparatus.

2. The display apparatus of claim 1, further comprising a first storage device which stores at least one program performing a predetermined function, wherein the upgrade apparatus comprises a second storage device storing an upgraded version of the at least one program, and the second controller executing the at least one program in the upgraded version and controlling the power supply device when the upgrade apparatus is connected through the connection device.

3. The display apparatus of claim 2, wherein the second controller controls the power supply device to selectively block supply of power either to the first storage device and the first controller of the display apparatus, or to the upgrade apparatus when the upgrade apparatus is connected through the connection device.

4. The display apparatus of claim 3, further comprising a user input device which inputs a user selection, wherein the second controller controls the power supply device to block supply of power to the first storage unit and the first controller when a power saving mode of the display apparatus is selected through the user input device.

5. The display apparatus of claim 3, further comprising a user input device which inputs a user selection, wherein when a first user selection is input through the user input device, the second controller determines whether the first user selection is executable by the at least one program of the first storage device, and controls the power supply device to supply power to the first storage device and the first controller if the first user selection is executed by the at least one program of the first storage device.

6. The display apparatus of claim 5, wherein the second controller controls the power supply device such that the upgrade apparatus is in a sleep mode when the first user selection is executed by the at least one program of the first storage device.

7. The display apparatus of claim 5, wherein the second controller controls the power supply device such that the upgrade apparatus is turned off when the first user selection is executed by the at least one program of the first storage device.

8. The display apparatus of claim 2, wherein the second controller controls the power supply device to supply power both to the first storage device and the first controller, and to the upgrade apparatus.

9. The display apparatus of claim 2, further comprising a user input device to input a user selection, wherein the second controller controls the power supply device to supply power both to the first storage device and the first controller and to the upgrade apparatus when a second user selection is input through the user input device and the second user selection executes the program of the first storage device and the program of the second storage device at the same time.

10. The display apparatus of claim 8, wherein the first controller further comprises a graphic processing device to conduct post-processing on the processed image signal, and the graphic processing device conducts post-processing on the image signal received from the upgrade apparatus.

11. The display apparatus of claim 10, wherein the post-processing comprises at least one of graphic application processing, image quality enhancement, definition enhancement, image filtering, giving a sepia effect, and 2D-3D conversion.

12. The display apparatus of claim 10, wherein the first controller controls the image processing device to mix the post-processed image signal and the image signal received from the upgrade apparatus and controls the display device to display an image based on the mixed image signal.

13. The display apparatus of claim 10, wherein the post-processing of the graphic processing device is carried out by running a shader program.

14. The display apparatus of claim 10, wherein the post-processing of the graphic processing device is asynchronously carried out with the image processing of the upgrade apparatus.

15. The display apparatus of claim 8, wherein the first controller controls the connection device to transmit the image signal processed by the image processing device to the upgrade apparatus, and to receive the post-processed image signal from the upgrade apparatus.

16. The display apparatus of claim 15, wherein the post-processing comprises at least one of graphic application processing, image quality enhancement, definition enhancement, image filtering, giving a sepia effect, and 2D-3D conversion.

17. The display apparatus of claim 15, wherein the first controller controls the image processing device to mix the image signal processed by the image processing device with the image signal received from the upgrade apparatus, and controls the display device to display an image based on the mixed image signal.

18. The display apparatus of claim 15, wherein the image processing of the image processing device is asynchronously carried out with the post-processing of the graphic processing device.

19. An upgrade apparatus of a display apparatus comprising:
    a connection device which connects to the display apparatus comprising a power supply device and displaying an image;
    an image processing device which processes an image signal corresponding to the image displayed on the display apparatus; and
    a second controller which controls the connection device to receive the image signal from the display apparatus and transmit the processed image signal by the image processing device to the display apparatus when the upgrade apparatus is connected to the display apparatus through the connection device,
    wherein, in response to the upgrade apparatus being connected to the display apparatus through the connection device, the power supply device of the display apparatus is controlled by the second controller of the upgrade apparatus.

20. The upgrade apparatus of claim 19, wherein the display apparatus further comprises a first storage device storing at least one program to perform a predetermined function and a first controller to execute the at least one program, the upgrade apparatus further comprises a second storage device which stores an upgraded version of the at least one program, and the second controller controls the power supply device to selectively block supply of power either to the first storage device and the first controller or to the second storage device when the upgrade apparatus is connected through the connection device.

21. The upgrade apparatus of claim 20, wherein the second controller controls the power supply device to block supply of power to the first storage device and the first controller when a user selection of a power saving mode is received from the display apparatus through the connection device.

22. The upgrade apparatus of claim 20, wherein when a first user selection is received from the display apparatus through the connection device, the second controller determines whether the first user selection is executed by the at least one program of the first storage device, and controls the power supply device to supply power to the first storage device and the first controller if the first user selection is executed by the program of the first storage device.

23. The upgrade apparatus of claim 22, wherein the second controller controls the power supply device such that the upgrade apparatus is in a sleep mode when the first user selection is executed by the at least one program of the first storage device.

24. The upgrade apparatus of claim 22, wherein the second controller controls the power supply device such that the upgrade apparatus is turned off when the first user selection is executed by the at least one program of the first storage device.

25. The upgrade apparatus of claim 20, wherein the second controller controls the power supply device to supply power both to the first storage device and the first controller and to the second storage device.

26. The upgrade apparatus of claim 20, wherein the second controller controls the power supply device to supply power both to the first storage device and the first controller and to the second storage device when a second user selection is received from the display apparatus through the connection device and the second user selection executes the program of the first storage device and the at least one program of the second storage device at the same time.

27. The upgrade apparatus of claim 25, wherein the second controller comprises a graphic processing device to conduct post-processing on the processed image signal and controls the connection device to receive the processed image signal from the display apparatus, and the graphic processing device conducts post-processing on the received image signal.

28. The upgrade apparatus of claim 27, wherein the post-processing comprises at least one of graphic application processing, image quality enhancement, definition enhancement, image filtering, giving a sepia effect, and 2D-3D conversion.

29. The upgrade apparatus of claim 27, wherein the second controller controls the connection device to transmit the post-processed image signal to the display apparatus.

30. The upgrade apparatus of claim 27, wherein the post-processing of the graphic processing device is carried out by running a shader program.

31. The upgrade apparatus of claim 27, wherein the post-processing of the graphic processing device is asynchronously carried out with the image processing of the display apparatus.

32. A control method of a display apparatus including an image processing device to process an image signal and a power supply device to supply power, the control method comprising:
connecting an upgrade apparatus to the display apparatus through a connection device, the upgrade apparatus including a second image processing device to process the image signal displayed on the display apparatus and a second controller; and
controlling, by the second controller of the upgrade apparatus, a power supply from the power supply device to the display apparatus and the upgrade apparatus.

33. The control method of claim 32, wherein the controlling the power supply comprises the second controller of the upgrade apparatus selectively blocking the power supply either to a first storage unit and a first controller of the display apparatus, or to the upgrade apparatus.

34. The control method of claim 33, further comprising inputting a user selection of selecting a power saving mode of the display apparatus, wherein the selectively blocking the power supply blocks power supply to the first storage device and the first controller.

35. The control method of claim 33, further comprising inputting a first user selection and transmitting the first user selection to the upgrade apparatus; and determining by the upgrade apparatus whether the first user selection is executed by a program of the first storage device, wherein the controlling the power supply comprises supplying power to the first storage device and the first controller when the first user selection is determined to be executed by the program of the first storage unit device.

36. The control method of claim 35, wherein the controlling the power supply comprises controlling power supply so that the upgrade apparatus is in a sleep mode when the first user selection is determined to be executed by the program of the first storage device.

37. The control method of claim 35, wherein the controlling the power supply comprises blocking power supply to the upgrade apparatus when the first user selection is determined to be executed by the program of the first storage device.

38. The control method of claim 32, wherein the controlling the power supply comprises supplying power both to a first storage device and a first controller of the display apparatus, and to the upgrade apparatus.

39. The control method of claim 38, further comprising inputting a second user selection and transmitting the second user selection to the upgrade apparatus, wherein the controlling the power supply comprises supplying power both to the first storage device and the first controller and to the upgrade apparatus when the second user selection executes a program of the first storage device and a program of a second storage device at the same time.

40. The control method of claim 38, further comprising receiving the processed image signal from the upgrade apparatus; and conducting post-processing on the received processed image signal.

41. The control method of claim 40, wherein the post-processing comprises at least one of graphic application processing, image quality enhancement, definition enhancement, image filtering, giving a sepia effect, and 2D-3D conversion.

42. The control method of claim 40, further comprising mixing the post-processed image signal and the image signal received from the upgrade apparatus; and displaying an image based on the mixed image signal.

43. The control method of claim 40, wherein the conducting the post-processing is carried out by a graphic processing device running a shader program.

44. The control method of claim 40, wherein the conducting the post-processing is asynchronously carried out with the image processing of the upgrade apparatus.

45. The control method of claim 38, further comprising: processing an image signal by the image processing device; transmitting the processed image signal to the upgrade apparatus; receiving a post-processed image signal from the upgrade apparatus.

46. The control method of claim 45, wherein the post-processing comprises at least one of graphic application processing, image quality enhancement, definition enhancement, image filtering, giving a sepia effect, and 2D-3D conversion.

47. The control method of claim 45, further comprising mixing the image signal processed by the image processing device with the image signal received from the upgrade apparatus and displaying an image based on the mixed image signal.

48. The control method of claim 45, wherein the image processing of the image processing device is asynchronously carried out with the post-processing of the upgrade apparatus.

49. A control method of an upgrade apparatus connected to a display apparatus including a power supply device, the control method comprising:
   connecting the upgrade apparatus to the display apparatus through a connection device, the upgrade apparatus including a second image processing device to process an image displayed on the display apparatus and a second controller;
   controlling, by the second controller of the upgrade apparatus, a power supply from the power supply device to the display apparatus and the upgrade apparatus.

50. The control method of claim 49, wherein the display apparatus further includes a first storage device to store at least one program to perform a predetermined function and a first controller to execute the program, the upgrade apparatus further comprises a second storage device to store an upgraded version of the at least one program, and the controlling the power supply comprises the second controller of the upgrade apparatus selectively blocking power supply either to the first storage device and the first controller of the display apparatus, or to the second storage device of the upgrade apparatus.

51. The control method of claim 50, further comprising receiving a user selection of selecting a power saving mode of the display apparatus, wherein the selectively blocking the power supply blocks power supply to the first storage device and the first controller.

52. The control method of claim 50, further comprising receiving a first user selection from the display apparatus; and determining by the upgrade apparatus whether the first user selection is executable by the at least one program of the first storage device, wherein the controlling the power supply comprises supplying power to the first storage device and the first controller when the first user selection is determined to be executed by the at least one program of the first storage device.

53. The control method of claim 52, wherein the controlling the power supply comprises controlling power supply so that the upgrade apparatus is in a sleep mode when the first user selection is determined to be executed by the at least one program of the first storage device.

54. The control method of claim 50, wherein the controlling the power supply comprises supplying power both to the first storage device and the first controller of the display apparatus, and to the second storage device of the upgrade apparatus.

55. The control method of claim 50, further comprising receiving a second user selection to execute the at least one program of the first storage device and the program of the second storage device at the same time from the display apparatus, wherein the controlling the power supply comprises supplying power both to the first storage device and the first controller and to the second storage device.

56. The control method of claim 54, further comprising receiving a processed image signal from the display apparatus to display the image; and conducting post-processing on the received image signal.

57. The control method of claim 56, wherein the post-processing comprises at least one of graphic application processing, image quality enhancement, definition enhancement, image filtering, giving a sepia effect, and 2D-3D conversion.

58. The control method of claim 56, further comprising transmitting the post-processed image signal to the display apparatus.

59. The control method of claim 56, wherein the conducting the post-processing is carried out by a graphic processing device of the upgrade apparatus running a shader program.

60. A display system comprising: a display apparatus comprising a first image processing device which processes an image signal, a display device which displays an image based on the processed image signal, a power supply device which supplies power, and a first storage device which stores at least one program to perform a predetermined function and a first controller; and
   an upgrade apparatus connected to the display apparatus and comprising a second image processing device which processes the image signal, a second storage device which stores an upgraded version of the at least one program and a second controller,
   wherein, in response to the upgrade apparatus being connected to the display apparatus through a connection device, the second controller of the upgrade apparatus controls the power supply device to control power supply to the display apparatus and the upgrade apparatus.

61. The display system of claim 60, wherein the display apparatus further comprises a first graphic processing device to conduct post-processing on the processed image signal and controls the first graphic processing device to receive the image signal processed by the second image processing device from the upgrade apparatus and to conduct post-processing on the received image signal.

62. The display system of claim 60, wherein the upgrade apparatus further comprises a second graphic processing device to conduct post-processing on the processed image signal and controls the second graphic processing device to receive the image signal processed by the first image processing unit from the display apparatus and to conduct post-processing on the received image signal.

63. A control method of upgrading hardware or software when an upgrade apparatus is connected to a display apparatus, the control method comprising:
   in response to the upgrade apparatus being connected to the display apparatus, supplying power, by a second controller of the upgrade apparatus, to the display apparatus and the upgrade apparatus including a second image processing device to process an image displayed on the display apparatus and the second controller;
   receiving an image signal in the display apparatus;

transmitting the received image signal to the upgrade apparatus;
controlling, by the second controller of the upgrade apparatus, the second image processing device of the upgrade apparatus to process the received image signal;
transmitting the processed image signal to the display apparatus;
post-processing, by a first controller of the display apparatus, the processed image signal received from the upgrade apparatus;
mixing the post-processed image signal and the processed image signal, and scaling the mixed signal; and
displaying an image corresponding to the scaled mixed signal.

* * * * *